(No Model.) 2 Sheets—Sheet 1.

G. EASTMAN.
CAMERA.

No. 408,596. Patented Aug. 6, 1889.

Witnesses
Thomas Durant
Alex G. Stewart

Inventor
George Eastman
By his Attorneys
Church & Church

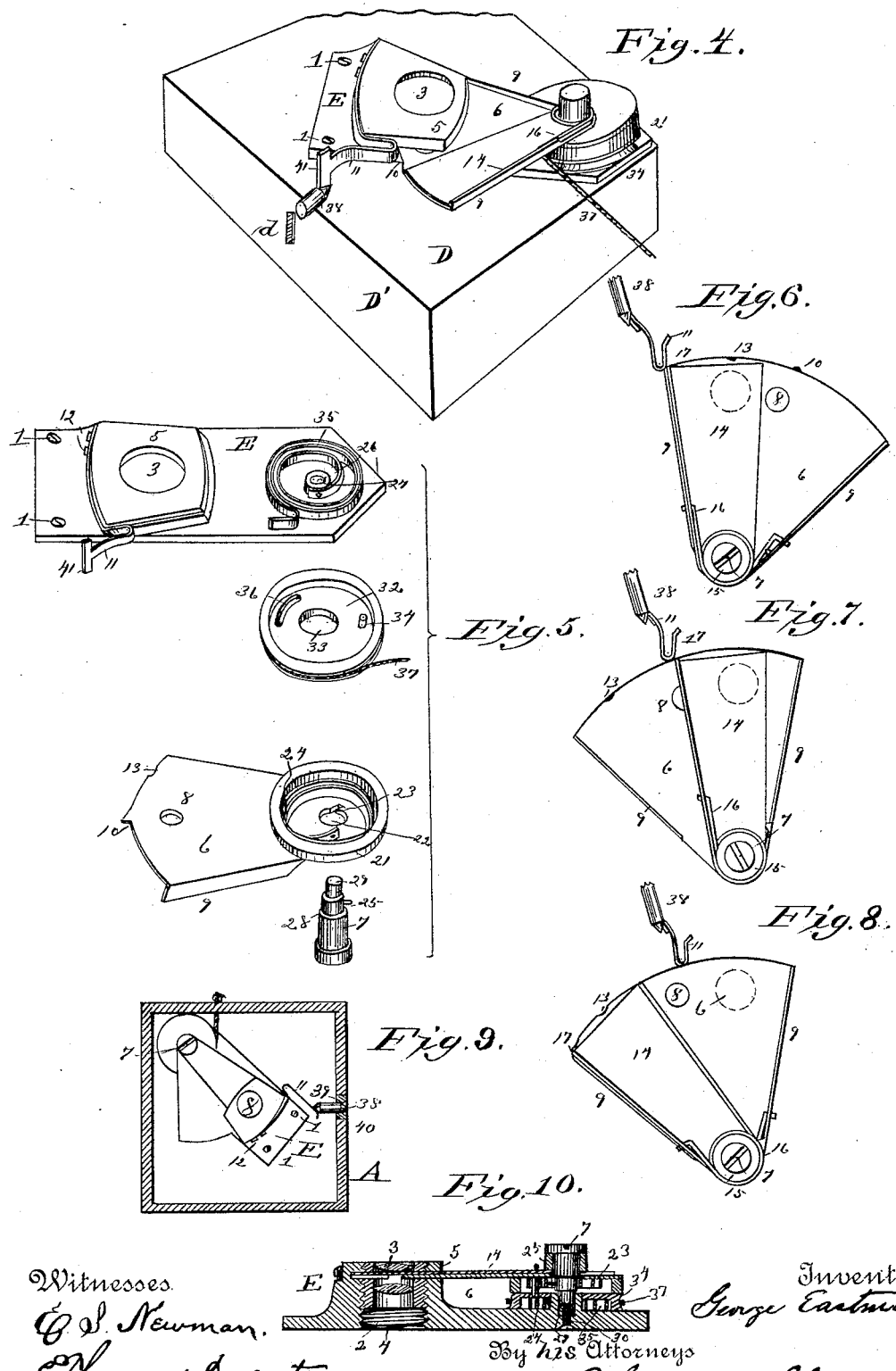

UNITED STATES PATENT OFFICE.

GEORGE EASTMAN, OF ROCHESTER, NEW YORK, ASSIGNOR TO THE EASTMAN DRY PLATE AND FILM COMPANY, OF SAME PLACE.

CAMERA.

SPECIFICATION forming part of Letters Patent No. 408,596, dated August 6, 1889.

Application filed January 4, 1889. Serial No. 295,487. (No model.)

*To all whom it may concern:*

Be it known that I, GEORGE EASTMAN, of Rochester, in the county of Monroe and State of New York, have invented certain new and useful Improvements in Cameras; and I do hereby declare the following to be a full, clear, and exact description of the same, reference being had to the accompanying drawings, forming a part of this specification, and to the figures and letters of reference marked thereon.

This invention relates more particularly to improvements in that class of photographic apparatus known as "detective cameras;" and it consists in the novel form of construction and arrangement of the camera-body, the lens support and adjusting device, and the exposing-shutter and operating devices, and in certain details and parts, all as will be hereinafter described, and set forth particularly in the claims at the end of the specification.

Figure 1:
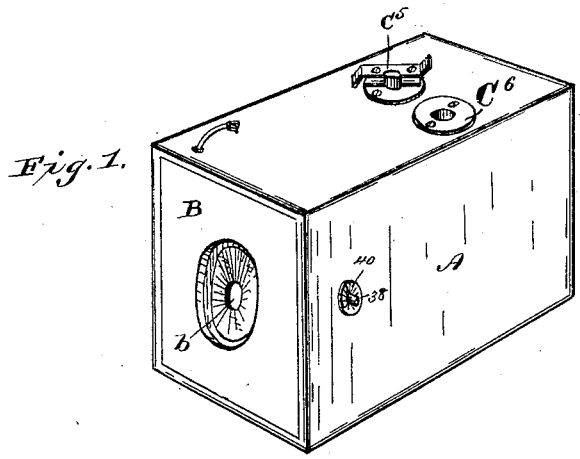
Figure 2:
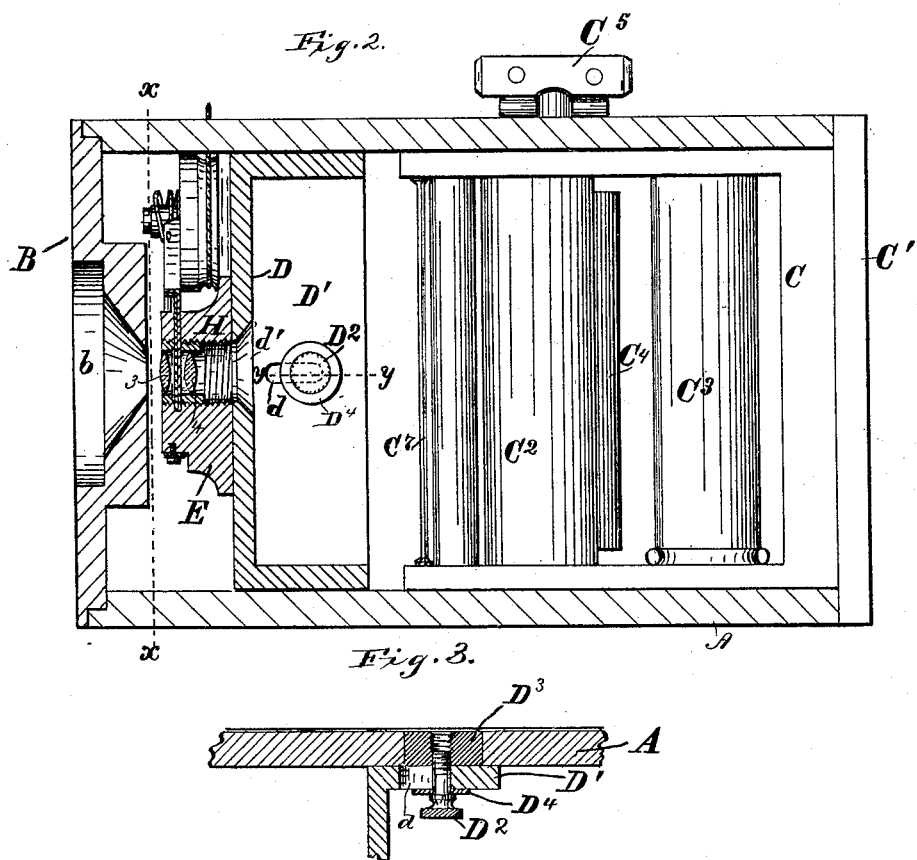
Figure 3:
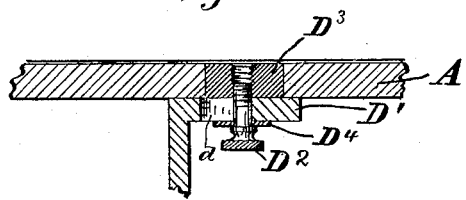

In the accompanying drawings, wherein I have illustrated one embodiment of my present improvements, Figure 1 is a view in perspective of the complete instrument; Fig. 2, a longitudinal sectional view of the same; Fig. 3, a detail section on the line $y\ y$ of Fig. 2; Fig. 4, a perspective view of the shutter and the frame carrying it; Fig. 5, a view of the parts of the shutter separated; Figs. 6, 7, and 8, views of the shutter, showing the positions occupied by the parts in operation; Fig. 9, a sectional view on the line $y\ y$ of Fig. 2; Fig. 10, a sectional view of the shutter and support.

Similar letters of reference in the several figures denote similar parts.

The letter A designates the camera box or case, preferably constructed in the form of a rectangular tube, at one end of which is secured an end piece B, having a perforation $b$ therein. The rear end of the tube or case is adapted to be closed by a roller-holder for carrying sensitive photographic film, (substantially as shown in Letters Patent No. 388,850, granted me September 4, 1888,) secured to or formed integral with the rear cap plate or cover C', and the sides of said holder upon which the operating devices are supported are formed to fit snugly within the tube A, the cover C' overlapping or otherwise co-operating with the end of the box A to form a light-tight connection, so that when said roller-holder is inserted and held within the end of the box the sensitized film or plate will be entirely protected from light in rear and at the sides, and will only be exposed to light entering through the perforation $b$ in the end piece and the lens inserted between this and said film.

As the specific construction of the roll-holder forms no part of my present invention except in so far as it is adapted to a camera of this class, its construction need not be specifically described. Suffice it to say it embodies a suitable measuring-roller $C^2$, a supply-roller $C^3$, a winding-roller $C^4$, with which a key $C^5$ is connected, so that the operator can by rotating this reel forward a new supply of film after making an exposure, the measuring-roll being also provided with a mark or indication on its end adapted to co operate with a mark in the thimble $C^6$, secured to the case, so as to indicate when the proper amount of film for a single exposure has been reeled forward over the film-support $C^7$. For a more full description of this roller-holder, which is but one of the many forms that could be devised, reference is made to the above-mentioned patent.

Between the end piece B and the roller-holder C is located a frame D, carrying the lens and shutter, preferably of rectangular tubular form to slide readily within the case from the rear and of sufficient length to have a bearing on the inside of the case and prevent tilting, and two of the sides D' D' of this frame are provided with slots $d\ d$, through which pass screws $D^2$, having milled heads, and entering corresponding nuts $D^3$, secured in the casing, suitable washers $D^4$ being interposed between said heads and the frame, as shown. These screws can be manipulated by suitable tools inserted from the rear, and upon being loosened the frame can be moved in or out to adjust the focus of the lens, and the screws then tightened before the cameras are sent out.

The front of frame D is of course provided with a perforation $d'$ to permit the passage of light, and upon this frame is secured the lens and shutter holder E, as clearly shown in Fig. 4. This support E is constructed, preferably, of metal, secured to the front of the frame D by means of screws 1 1, and at one end is provided with a threaded perforation 2, in which one 4 of the pair of lenses is secured, as shown, while the other one 3 is secured in a corresponding manner in an overhanging portion 5 of the support, as shown, a slit being left between the support and portion 5 for the passage of the shutter 6.

My present shutter, while adapted to be applied to the support carrying the lens in this particular instance, though not necessarily so, relates to that class constructed of opaque material, adapted to pass transversely of the lens-axis, and provided with an aperture which in transit coincides with the lens-openings, permitting the passage of light to the plate or film. Such shutters, however, cannot be applied to cameras in which film is employed unless some light-intercepting medium is interposed between the lens and film while the shutter is being moved back to first position, as otherwise the second coincidence of the shutter-aperture and lens-opening would cause a second exposure of the film, and as this return of the shutter to first position is caused by a manual operation it would not answer for instantaneous work. To adapt this kind of shutter, therefore, for instantaneous work without necessitating the capping of the lens or using a slide is the general object of the present improvement, and it is accomplished by the employment of an auxiliary shutter operated upon by the main shutter, so that when the latter is moved to set position the lens will be covered during the passage of the exposing-opening in front of it.

In the present embodiment of my invention I have shown the manner of applying it to a pivoted oscillating shutter, which, perhaps, is best adapted to cameras of small size, such as herein shown; but I do not wish to be understood as confining my invention to this arrangement.

The present shutter is preferably constructed of some thin opaque material—such as sheet metal—in the form of a segment pivoted at its smaller end upon a suitable pivot-pin 7 and provided near its periphery with an exposing-aperture 8, which latter is adapted when the shutter is moved by a suitable motor to cross the axis of the lens (preferably in the slit between the portions of the lens-holding block) and permit the passage of light to the sensitized film or plate, the motion being limited by suitable stops, formed in the present instance by flanges 9 9, turned up at the edges, as shown, to co-operate at the extremes of movement with the sides of the lens-holding block. The periphery of the shutter is provided with a beveled projection 10, with which co-operates a spring-latch 11, (preferably composed of a single piece of spring metal secured to the lens-holder by screws 12 12,) which latch engages said projection when the shutter is in set position and the motor-spring wound up ready to make an exposure. A second notch 13 is provided and so arranged relative to the latch and lens-opening that the latch will enter it when the opening 8 coincides with the lens-opening, thus providing for making a time exposure when desired, as will be farther on described. Upon the main shutter 6 is an auxiliary shutter 14, having a boss 15, pivoted upon the stud 7 and permitted a free movement over the main shutter, said shutter 14 being held normally against the left-hand flange 9 by a spring 16, encircling the boss 15 and having its ends secured to flanges on the two shutters, preferably by being inserted through perforations therein. This auxiliary shutter is sufficiently wide to cover the exposing-aperture, and in the present instance is of a length equal to that of the main shutter, though this is not essential, the object being to cover the aperture 8 and unlatch the auxiliary shutter after the former has passed the lens-opening, which I accomplish in this instance by providing the auxiliary at its outer edge with a projection 17, also adapted to be engaged at certain times by the latch 11 and held over the lens-opening while the main shutter is being moved back to the first position after making an exposure.

In Fig. 6 is shown the position the shutter will occupy after an exposure has been made, the solid portion of the main and auxiliary shutters covering the lens-opening. Now, when the shutter is moved back to first position by suitable mechanism acting against the tension of the motor-spring, (the construction and operation of one form of both being presently described,) the latch 11, engaging the projection 17 on the auxiliary shutter, will retain the latter in position—i. e., covering the lens-opening—while the main shutter is being moved back and until the exposing-aperture has passed beyond the lens-opening, thus preventing light passing through and striking the film or plate. This movement also puts the spring 16 under tension. As soon as the position indicated in Fig. 7 is reached the beveled portion of the projection 10 strikes the latch and, being a trifle higher than the projection 17, raises the latter until the auxiliary shutter is released, when the spring 16 immediately returns it to first or normal position against flange 9, and the latch drops behind projection 10, holding the main shutter in the position in Fig. 8 with its motor-spring under tension.

Now, in order to make an exposure, the latch is raised by any suitable device and the shutter is moved across to the position in Fig. 6 by its motor-spring, causing the aperture 8 to pass across the axis of the lens, admitting the rays of light passing therethrough to the film or plate.

A convenient and perhaps the simplest form of motor mechanism for operating the shutter is shown in detail in Figs. 5 and 10, though any other could be employed, if desired, or this mechanism may be employed on other shutters not embodying all of my improvements.

The under side of the main shutter near one end is provided with an annular casing 21 around the pivotal aperture 22, in which is located a volute spring 23, one end of which is fastened to a pin 24, slightly longer than the depth of the casing, while the other is connected to a pin 25, projecting from the side of the pivotal stud 7, as shown, the tendency of the spring being, when the stud is held stationary, to vibrate the shutter in the direction of the arrow, Fig. 4. The top of the support E is provided with the perforation 26, and the boss 27 surrounding it extends upward a short distance, while the stud 7 is provided with a shoulder 28, adapted to rest upon the top of said boss, its lower reduced portion entering and fitting the perforation 26, while its end is provided with a threaded recess 29, into which a small screw 30 is screwed, the head of the latter resting against the bottom of the support E and operating to hold the stud in position securely. It will be seen that by loosening screw 30 and rotating stud 7 to the right or left the tension of spring 23 can be increased or diminished, as desired, and the spring secured by tightening said screw.

The shutter should be returned to first or set position and its propelling-spring wound up from the exterior in a camera of this kind, and as a means for accomplishing this and at the same time forming a compact and simple arrangement of parts I provide beneath the shutter a disk 32, having a central perforation 33, adapted to fit over the boss 27 on the support, and an annular depending exteriorly-grooved flange 34, resting upon the base, as shown, and to a pin on the inside of this disk is connected one end of a volute spring 35, the other end being connected to a pin on the outer side of the boss 27 on the base. A segmental slot 36 is provided in the disk, in which the lower end of pin 24 on casing 21 projects when the parts are secured together, and a cord 37 is attached to the annular flange, adapted to be wound one or more turns around it when rotated by the spring, the outer free end of the cord extending to the outside of the casing through a suitable perforation and provided with a knot or projection. The spring 35 operates to turn disk 32 to the right and wind up the cord in the groove when the tension of the latter is released, and the length on the slot and cord is such that the pin 24 will move freely in the former when the shutter is released without striking the end of the slot.

In Fig. 5 the top of the supporting-plate E is shown, while the other parts are reversed—that is, they are removed from the plate and turned over to better show their construction.

Any suitable device can be employed for operating the latch 11; but I prefer to use a pin 38, extending through a thimble 40 in the casing and having a pointed or beveled end, as shown, arranged to strike the under side of the latch end and raise the latter, thereby releasing the shutter when said pin is pushed inward, the spring-latch itself causing its outward movement, which is limited by a collar or pin 39, arranged to strike the inside of the thimble, or the side of the casing if the thimble is not employed. As the shutter is mounted on the movable frame D, which, as stated, is capable of being adjusted in the camera while the latch-operating pin is stationary, I provide the latch with a laterally-extending end 41, so that the pin 39 will engage it properly when the frame is adjusted slightly in either direction.

The operation of the parts will be readily understood. The operator, having wound a supply of film forward over the supporting-plate $C^7$, (the shutter being in the position shown in Fig. 6, where it was left after the last exposure,) draws the cord 37 outward, rotating the disk 32 against the tension of its spring and causing the end of the slot 36 to engage the pin 24 and carry the shutter around to the position in Fig. 8, thus winding up its spring 23 until the latch engages the projection 10, when it will be held, the operation of the auxiliary shutter taking place as before described. Upon the release of the cord the spring 35 returns disk 32 to first position, winding up the cord, but, by reason of the segmental slot, leaving the shutter in set position. The camera is now pointed at the object to be photographed and the pin 39 moved in, causing the latch to release the shutter and its spring to vibrate it, thereby moving the exposing-aperture past the lenses and admitting light to the film, the latch immediately returning the pin 39 to normal position. The exposed film can now be wound forward, the shutter reset, and further exposures made as required. In order that time exposures may be made, if desired, I provide the notch 13 in the edge of the main shutter, with which the latch co-operates when the aperture 6 coincides with the lens-axis, said notch not being of sufficient depth to catch and hold the shutter when it is moved rapidly for instantaneous work, but sufficient to hold it when the shutter is stopped at this point. The shutter is set to this position by moving it clear across to the position in Fig. 8, and then, instead of releasing the setting-cord, the operator presses the latch-releasing button and gradually lets the shutter rotate until the latch catches in the notch 13. The exposure is made by means of a small plug adapted to fit in the perforation $b$ in the end of the camera, said plug being removed and replaced by the operator, making the exposure as long or short as desired. To return the shutter to normal position, it is necessary to press the pin 39, causing the release of the latch, or by pulling the cord outward again set the shutter with the lens-opening closed and ready for instantaneous exposure.

The improved shutter herein shown, while it is particularly adapted to cameras of this class, can of course be applied to any form, the slight modification in construction that might be necessary readily occurring to one skilled in the art, and, instead of operating between the lenses, as in the present instance, the aperture 8 could be made larger and the shutter located in front or behind them, as desired.

In lieu of the roller-holder employed in this camera a plate-holder of any suitable construction could be applied, if desired.

I claim as my invention—

1. In a camera, the combination, with the tubular casing having the fixed front and the small aperture therein, of the frame carrying the lens and shutter adapted to be inserted from the rear, securing devices for fastening the frame to the casing operated only from the interior of the casing, and a holder for sensitized material fitting the casing and forming the rear end of the camera, substantially as described.

2. In a camera, the combination, with the tubular casing having the small aperture in the end, of the frame carrying the lens fitting inside the casing, having the slotted sides, and the screws for securing it to the casing, substantially as described.

3. In a camera, the combination, with the casing, of the frame carrying the lens and shutter capable of adjustment therein, a latch for the shutter having a laterally-extended end, and a releasing-pin for operating the latch supported in the casing, substantially as described.

4. In a photographic shutter, the combination, with a lens-opening and a perforated movable shutter, of an auxiliary shutter and a latch for holding it in line with the lens-opening, substantially as described.

5. In a photographic shutter, the combination, with a lens-opening and a perforated movable shutter, of an auxiliary shutter adapted to be moved in line with the lens-opening, a latch for holding said auxiliary shutter, and a projection operated by the main shutter adapted to engage the latch and release the auxiliary shutter, substantially as described.

6. In a photographic shutter, the combination, with a lens-opening and a perforated movable exposing-shutter, of an auxiliary opaque shutter, a spring for moving it, and a latch for holding it in line with the lens-opening, substantially as described.

7. In a photographic shutter, the combination, with a lens-opening and a perforated movable exposing-shutter, of an auxiliary opaque shutter and connections between it and the main shutter whereby it is moved in line with the lens-opening when the main shutter is moved in one direction, substantially as described.

8. In a photographic shutter, the combination, with a lens-opening and a perforated movable exposing-shutter, of an auxiliary shutter and connections between it and the main shutter for moving it in line with the lens-opening by the movement of the latter, a spring for moving the auxiliary shutter independently, and a latch operated by the exposing-shutter releasing the auxiliary, substantially as described.

9. In a photographic shutter, the combination, with a lens-opening and a perforated exposing-shutter, of an auxiliary shutter, a spring connecting the two shutters, and connections between them for moving the auxiliary over the lens-opening by the movement of the main exposing-shutter, and a latch for holding the auxiliary adapted to be released by the main shutter, substantially as described.

10. In a photographic shutter, the combination, with the perforated exposing-shutter, of an auxiliary shutter arranged to cover the exposing-aperture in the main shutter while passing the lens-opening moving in one direction, a catch for holding the auxiliary in this position, and devices for releasing the catch after the exposing-aperture has passed the lens, substantially as described.

11. In a photographic shutter, the combination, with the perforated shutter having a stop thereon, of an auxiliary shutter and connections between them for causing their simultaneous movement when operated in one direction and a latch engaging the stop on the main and the auxiliary shutters, substantially as described.

12. In a photographic shutter, the combination, with the perforated exposing-shutter having a stop thereon, an auxiliary shutter, and connections between them for causing their simultaneous operation when operated in one direction, of a latch for engaging the stop on the exposing and the auxiliary shutter, said stop on the exposing-shutter operating to release the auxiliary shutter before being itself engaged by the latch, substantially as described.

13. The combination, with the perforated exposing main shutter having a stop thereon, an auxiliary shutter, and connections between them for causing their simultaneous movement when operated in one direction, of a catch for engaging the stop on the exposing and the auxiliary shutter, said stop on the exposing-shutter operating to release the auxiliary shutter before being itself engaged by the latch, and a manually-operated portion co-operating with the latch to cause the release of the exposing-shutter, substantially as described.

14. In a photographic shutter, the combination, with the base or support, of the exposing-shutter having the flange on one side, the auxiliary shutter operated by the main shutter, and the spring for holding it against the said flange, substantially as described.

15. In a photographic shutter, the combination, with the base or support, of the exposing-shutter having the laterally-projecting flange adapted to engage the side of the support and constitute a stop to limit the movement in one direction, substantially as described.

16. In a photographic shutter, the combination, with the base or support, of an exposing-shutter having the flanges on opposite sides adapted to engage the support and constituting stops for limiting the movement in opposite directions, substantially as described.

17. The combination, with the base or support constructed of a single piece of material having two coincident apertures for the lenses and a slit between them, of a pivoted shutter operating in the slit and a latch for operating on the shutter, substantially as described.

18. In a photographic shutter, the combination, with the base or support constructed of a single piece of material having two coincident apertures for the lenses and a slit between them, of a pivoted oscillating shutter operating in the slit and a latch for operating on the shutter, substantially as described.

19. In a photographic shutter, the combination, with the base or support having the boss, of the exposing-shutter, the stud passing through it, the spring connected to the shutter and the stud, and the slotted disk pivoted on the boss arranged to connect with and move the shutter when rotated in one direction, substantially as described.

20. In a photographic shutter, the combination, with the base or support, the exposing-shutter, and a spring for operating it in one direction, of a pivoted plate arranged concentric with the shutter-pivot, a slot-and-pin-connection between the said plate and shutter, a spring for rotating the plate, and the flexible cord connected to the plate, substantially as described.

21. As a means for operating a pivoted oscillating photographic shutter to set it, the combination of a plate pivoted on the pivotal center of the shutter, a spring for oscillating said plate in one direction, and a flexible cord connected to the plate and moving the shutter, substantially as described.

22. In a photographic shutter, the combination, with the base or support and a latch, of the pivoted shutter having a pin and a flange or casing, a spring connected to the shutter inside the casing, a plate having a slot in which the pin on the shutter operates, a spring connected to the plate, and a flexible cord also connected to the plate for operating it against its spring, substantially as described.

23. In a photographic shutter, the combination, with the base having the boss and the stud thereon, of the shutter pivoted on the stud having a flange or casing and projecting pin, the spring connected to the shutter and stud inside the casing, the plate pivoted on the boss having the segmental slot, the spring connected to the plate and boss, and the flexible cord connected to said plate, substantially as described.

24. The combination, with the lens-opening and a reciprocating shutter provided with an exposing-aperture, of a reciprocating auxiliary shutter arranged to co-operate with the lens-opening when the main shutter is moved in one direction and to remain out of position when moved in the other, substantially as described.

25. In combination with the camera-box, the lens, and a reciprocating shutter provided with an exposing-aperture, a reciprocating auxiliary shutter arranged to co-operate with the lens and devices connected to the main and auxiliary shutters for moving both of them in one direction, with the auxiliary shutter covering the exposing-aperture, substantially as described.

26. In combination with a camera-box, a lens, and a reciprocating exposing-shutter, an auxiliary shutter co-operating with the lens to cover the exposing-aperture as the main shutter is operated in one direction, said auxiliary shutter being connected to the devices for operating the main shutter and operated thereby to insure the exclusion of light from within the camera-box during the movement of the main shutter in one direction, substantially as described.

27. In combination with the camera-box, the lens, and a reciprocating shutter provided with an exposing-aperture, an auxiliary shutter held removed from the lens-opening in one position, devices for operating the main shutter connected to the auxiliary shutter to automatically move the latter in line with the lens-opening during the passage of the aperture in the main shutter, and means for retracting the auxiliary shutter after the passage of the exposing-aperture in the main shutter, substantially as described.

GEO. EASTMAN.

Witnesses:
FRED F. CHURCH,
Z. L. DAVIS.